(12) United States Patent
Gao et al.

(10) Patent No.: US 12,468,170 B2
(45) Date of Patent: Nov. 11, 2025

(54) LIGHT FIELD DISPLAY SYSTEM

(71) Applicant: BOE Technology Group Co., Ltd., Beijing (CN)

(72) Inventors: Jian Gao, Beijing (CN); Tao Hong, Beijing (CN); Wenji Zhu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 623 days.

(21) Appl. No.: 17/435,367

(22) PCT Filed: Feb. 19, 2021

(86) PCT No.: PCT/CN2021/076865
§ 371 (c)(1),
(2) Date: Aug. 31, 2021

(87) PCT Pub. No.: WO2021/164734
PCT Pub. Date: Aug. 26, 2021

(65) Prior Publication Data
US 2022/0146853 A1 May 12, 2022

(30) Foreign Application Priority Data
Feb. 19, 2020 (CN) .......................... 202010102046.X

(51) Int. Cl.
*G02B 30/10* (2020.01)
*G02B 3/00* (2006.01)
*G02B 27/01* (2006.01)

(52) U.S. Cl.
CPC ........... *G02B 30/10* (2020.01); *G02B 3/0056* (2013.01); *G02B 27/0172* (2013.01);
(Continued)

(58) Field of Classification Search
CPC .. G02B 3/0056; G02B 27/0172; G02B 30/10; G02B 2003/0093; G02B 2027/0127;
(Continued)

(56) References Cited

U.S. PATENT DOCUMENTS 9,885,948 B2 * 2/2018 Segawa .................. H04N 9/315
10,823,967 B2 * 11/2020 Lo ....................... G02B 27/0172
(Continued)

FOREIGN PATENT DOCUMENTS

| CN | 102231044 A | 11/2011 |
|---|---|---|
| CN | 103176277 A | 6/2013 |

(Continued)

OTHER PUBLICATIONS

Douglas Lanman et al., Near-eye Light Field Displays, 32 ACM Transactions on Graphics 220:1 to 220:10 (2013). (Year: 2013).*
(Continued)

*Primary Examiner* — Thomas K Pham
(74) *Attorney, Agent, or Firm* — IPro, PLLC

(57) ABSTRACT

The present disclosure relates to a light field display system including: a plurality of light field display modules spliced at an angle, wherein each of the light field display modules includes a display screen and a micro-lens array located on a light-emitting side of the display screen; a lens group, including a plurality of spliced lenses corresponding to the plurality of light field display modules on a one-to-one basis, wherein the lens group is located on a side, away from the display screen, of the micro-lens array and configured to form a plurality of first imaging faces corresponding to the plurality of light field display modules on a one-to-one basis on one side, away from the micro-lens array, of the display screen, and the plurality of first imaging faces are seamlessly spliced to form a plurality of second imaging faces seamlessly spliced on a side, away from the light field display
(Continued)

module, of the plurality of first imaging faces, wherein the first imaging face is configured to display an upright virtual image of the corresponding light field display module.

9 Claims, 4 Drawing Sheets

(52) U.S. Cl.
CPC .............. *G02B 2003/0093* (2013.01); *G02B 2027/0127* (2013.01); *G02B 2027/0129* (2013.01); *G02B 2027/0134* (2013.01)

(58) Field of Classification Search
CPC .... G02B 2027/0129; G02B 2027/0134; G02B 27/1066
See application file for complete search history.

(56) References Cited

U.S. PATENT DOCUMENTS

| | | | | |
|---|---|---|---|---|
| 11,624,934 | B2* | 4/2023 | Makinen | G02B 27/4277 359/566 |
| 11,846,790 | B2* | 12/2023 | Makinen | G02B 30/29 |
| 2018/0024355 | A1* | 1/2018 | Gao | G02B 27/0172 359/630 |
| 2018/0107010 | A1 | 4/2018 | Wang et al. | |
| 2018/0210208 | A1* | 7/2018 | Zhou | G02B 27/1026 |
| 2018/0239305 | A1* | 8/2018 | Shi | G03H 1/0808 |
| 2019/0020869 | A1 | 1/2019 | Perreault et al. | |
| 2020/0371378 | A1* | 11/2020 | Makinen | H04N 13/365 |
| 2021/0302756 | A1* | 9/2021 | Makinen | G02B 30/10 |
| 2021/0405368 | A1 | 12/2021 | Gao | |

FOREIGN PATENT DOCUMENTS

| | | | | |
|---|---|---|---|---|
| CN | 103605210 | A | | 2/2014 |
| CN | 203522943 | U | | 4/2014 |
| CN | 103823305 | B | * | 5/2014 |
| CN | 105911747 | A | | 8/2016 |
| CN | 107991835 | A | * | 5/2018 ........... G02B 27/286 |
| CN | 108513123 | A | | 9/2018 |
| CN | 110402412 | A | | 11/2019 |
| CN | 110583016 | A | | 12/2019 |
| CN | 111175990 | A | | 5/2020 |
| CN | 114185170 | A | * | 3/2022 ......... G02B 27/0172 |
| CN | 116300132 | A | * | 6/2023 ............ G02B 30/27 |
| EP | 3968062 | B1 | * | 6/2024 ........... G02B 3/0068 |
| JP | H06208112 | A | | 7/1994 |
| KR | 20130077021 | A | | 7/2013 |
| TW | 202117397 | A | * | 5/2021 ........... G02B 6/0038 |
| TW | I748580 | B | * | 12/2021 ......... G02B 27/0172 |
| WO | WO-2013175549 | A1 | * | 11/2013 ......... G02B 26/0833 |
| WO | WO-2019095215 | A1 | * | 5/2019 ............. G02B 27/01 |
| WO | WO-2019164745 | A1 | * | 8/2019 ......... G02B 27/0075 |

OTHER PUBLICATIONS

Nikhil Balram et al., Light-Field Imaging and Display systems, 4 Information Display 6-13 (2016). (Year: 2016).*
Apertures and F/Numbers, 2016, pp. 1-2 [online], [retrieved May 3, 2023], retrieved from the Internet <URL: https://spacemath.gsfc.nasa.gov/weekly/10Page30.pdf>. (Year: 2016).*
Jung-Young Son et al., Holographic and Light Field Displays: What are the Differences?, 2017, pp. 1-2 [online], [retrieved Feb. 14, 2024], retrieved from the Internet <URL: https://ieeexplore.ieee.org/stamp/stamp.jsp?tp=&arnumber=8038184>. (Year: 2017).*
Mark E. Wilkinson et al., Optics Review (2017). (Year: 2017).*
John E. Greivenkamp, Stops and Pupils, 2018, pp. 1-47 [online], [retrieved May 3, 2023], retrieved from the Internet <URL: https://wp.optics.arizona.edu/jgreivenkamp/wp-content/uploads/sites/11/2018/12/201-202-10-Stops-and-Pupils.pdf>. (Year: 2018).*
Plano-Convex Lenses, 2019, one page [online], [retrieved Jan. 8, 2023], retrieved from the Internet <URL: https://web.archive.org/web/20190828102332/https://www.newport.com/c/plano-convex-lenses>. (Year: 2019).*
Reverse Lens Technique for Macro Photography, 2019, pp. 1-27 [online], [retrieved Feb. 15, 2024], retrieved from the Internet <URL: https://photographylife.com/reverse-lens-technique-for-macro-photography>. (Year: 2019).*
Darrell Bird, Why Viewing Angle is Important, 2020, pp. 1-8 [online], [retrieved Feb. 15, 2024], retrieved from the Internet <URL: https://www.portrait.com/resource-center/why-viewing-angle-is-important/>. (Year: 2020).*
Herbert Gross (ed.), Handbook of Optical Systems, vol. 3, 377-379 (2007). (Year: 2007).*
Spherical Lenses, 2019, pp. 1-6 [online], [retrieved Jul. 15, 2024], retrieved from the Internet <URL: https://web.archive.org/web/20190519044518/https://www.newport.com/g/spherical-lens-selection-guide>. (Year: 2019).*
Boyang Liu et al., Time-multiplexed Light Field Display with 120-degree Wide Viewing Angle, 27 Optics Express 35728-35739 ( 2019). (Year: 2019).*
Kishore Rathinavel et al., An Extended Depth-of-Field Volumetric Near-Eye Augmented Reality Display, 24 IEEE Transactions on Visualization and Computer Graphics 2857-2866 (2018). (Year: 2018).*
Rolf T. Borlinghaus, Resolved Field Number (RFN), 2019, pp. 1-8 [online], [retrieved Nov. 27, 2024], retrieved from the Internet <URL: https://www.leica-microsystems.com/science-lab/life-science/resolved-field-number-rfn/>. (Year: 2019).*
Haili Li et al., Distortion Correction and Image Registration of Ultralarge Field of View Near-eye Display Device, 59 Applied Optics 4422-4431 (2020). (Year: 2020).*
Image Plane, 2024, pp. 1-2 [online], [retrieved Nov. 27, 2024], retrieved from the Internet <URL: https://encyclopedia2.thefreedictionary.com/image+plane>. (Year: 2024).*
Fundamentals of Engineering Optics.
Encyclopedia of Photography.
CN 202010102046X first office action.
PCT/CN2021/076865 international search report and written opinion.

* cited by examiner

--Prior Art--

LIGHT FIELD DISPLAY SYSTEM

CROSS-REFERENCE TO RELATED APPLICATIONS

The present application is the U.S. national phase of PCT Application PCT/CN2021/076865 filed on Feb. 19, 2021, which claims priority to Chinese Patent Application No. 202010102046.X filed in China on Feb. 19, 2020, which is incorporated herein by reference in its entirety.

TECHNICAL FIELD

The present disclosure relates to the technical field of light field display, in particular to a light field display system.

BACKGROUND

In recent years, with the development of 3D technology, VR display technology has received wide attention, but its shortcomings are convergence conflict (binocular stereo vision position does not match monocular focus position), and long-term viewing will produce dizziness. As a display scheme to solve the convergence conflict of human eyes, the light field display has been studied for a long time in academic circles, but it has not achieved satisfactory results in terms of imaging field of view and distance imaging clarity. For example, the optical device for realizing light field display by using a micro lens enables the imaging field of the light field to be limited within +/−10° due to the aperture limitation of the single lens and the limitation of the imaging field angle, and with the increase of the imaging depth (the distance from the image plane of the light field to the display screen), the imaging resolution gradually decreases.

A method for spliced display screens would have been readily conceivable to solve the problem of an imaging field of view; and however, due to the limitation of a frame of a display screen, a splice seam would have been formed at the splice part of two adjacent display screens after splicing, thereby forming a display black area of a certain size on an imaging face.

SUMMARY

In order to solve the above-mentioned technical problem, the present disclosure provides a light field display system, which solves the problem of splice seam when a large field of view light field display is realized by means of spliced display screens.

In order to achieve the above-mentioned object, the technical solution adopted by the present disclosure is: a light field display system including:

a plurality of light field display modules spliced at an angle, wherein each of the light field display modules includes a display screen and a micro-lens array located on a light-emitting side of the display screen; and a lens group, including a plurality of spliced lenses corresponding to the plurality of light field display modules on a one-to-one basis, wherein the lens group is located on a side, away from the display screen, of the micro-lens array, configured to form a plurality of first imaging faces corresponding to the plurality of light field display modules on a one-to-one basis on the side, away from the micro-lens array, of the display screen, the plurality of first imaging faces are seamlessly spliced to form a plurality of second imaging faces seamlessly spliced on a side, away from the light field display module, of the plurality of first imaging faces, wherein the first imaging face is configured to display an upright virtual image of the corresponding light field display module.

Optionally, the first imaging face is located at a distance of distinct vision of a human eye.

Optionally, the spliced lens is a biconvex spherical lens, or a plano-convex spherical lens.

Optionally, each of the first imaging faces includes a first sub-imaging face and a second sub-imaging face, wherein the first sub-imaging face is configured to display an upright virtual image of the corresponding display screen, and the second sub-imaging face is configured to display an upright virtual image of the corresponding micro-lens array, and the first sub-imaging face is located on a focal plane of a virtual image of the micro-lens array displayed by the second sub-imaging face, so that a light beam emitted by a virtual image of the display screen displayed by the first imaging face forms a collimated light beam incident on a human eye.

Optionally, a plurality of light field display modules are spliced to form a curved surface, and the inner concave surface of the curved surface faces the human eye.

Optionally, a relationship between an actual distance $nf_2'$ between the first sub-imaging face and the second sub-imaging face and a distance t between the display screen and the micro-lens array satisfies the relationship:

$$\frac{nf_2'}{t} = \left(\frac{L_1 - L_3}{L_2}\right)^2$$

(1), where $f_2'$ is the distance between the first sub-imaging face and the second sub-imaging face after an equivalent air layer, $L_1$ is a distance between the human eye and the second sub-imaging face, $L_2$ is a distance between the spliced lens and the micro lens, $L_3$ is a distance between the human eye and the spliced lens, n is a refractive index of the micro lens, and t is the actual placement height of the micro lens relative to the display screen.

Optionally, the actual placement height t of the micro lens with respect to the display screen, the focal length $f_1$ of the spliced lens, and the focal length $f_2$ of the micro lens is obtained by the following formula:

according to an imaging principle of the convex lens, the following formula is obtained:

$$\frac{1}{-(f_1 - L_2)} + \frac{1}{t/n} = \frac{1}{f_2}; \quad (2)$$

$$\frac{1}{-(L_1 - L_3)} + \frac{1}{L_2} = \frac{1}{f_1}, \quad (3)$$

where $f_1$ is the focal length of the spliced lens, $f_2$ is the focal length of the micro lens, $f_2'$ is the distance from the first sub-imaging face to the second sub-imaging face after the equivalent air layer, $L_1$ is the distance from the human eye to the second sub-imaging face, $L_2$ is the distance between the spliced lens and the micro lens, $L_3$ is the distance from the human eye to the spliced lens, n is the refractive index of the micro lens, and t is the actual placement height of the micro lens relative to the display screen;

from the geometrical relations the following formula is obtained:

$$\frac{\Phi/N}{p'} = \frac{L_1}{f_2'}; \tag{4}$$

$$\frac{p'}{p} = \frac{L_1 - L_3 + nf_2'}{t + L_2}, \tag{5}$$

where Φ is the pupil diameter of a human eye, N is the number of viewpoints, p is the pixel spacing on the display screen, and p' is the pixel spacing in the virtual image of the display screen displayed by the first sub-imaging face;

from formulas (1) to (5):

$$f_2' = \frac{-b + \sqrt{b^2 - 4ac}}{2a} \tag{6}$$

is obtained;
where, $$a = \frac{\Phi n L_2^2}{(L_1 - L_3)^2},$$

$b = \Phi L_2 = npNL_1$, $c = -(L_1 - L_3)pNL_1$;
and from formulas (1) to (5):

$$t = \frac{nL_2^2 f_2'}{(L_1 - L_3)^2} \tag{7}$$

is obtained;

$$f_1 = \frac{L_2(L_1 - L_3)}{L_1 - L_3 - L_2}; \tag{8}$$

$$f_2 = \frac{t(f_1 - L_2)}{n(f_1 - L_2) - t}. \tag{9}$$

Optionally, the aperture $D_2$ of the micro lens satisfies the following formula:

$$D_2 \geq \frac{2L_1L_2}{L_1 - L_3}\tan\left(\frac{\varepsilon N}{2}\right),$$

where ε is a limiting angle of resolution of the human eye.

Optionally, the aperture $D_1$ of the spliced lens satisfies the following formula:

$$D_1 = 2L_3\tan\left(\frac{\theta}{2}\right),$$

where θ is a field angle corresponding to the single spliced lens.

Optionally, the width w of the display screen satisfies the following formula:

$$w = \frac{2(L_2 + t)(L_1 + nf_2')\tan\frac{\theta}{2}}{L_1 + nf_2' - L_3}.$$

Optionally, the plane side of the plano-convex spherical lens faces the direction of the human eye.

Optionally, the plurality of light field display modules are spliced to form a curved surface, and the inner concave surface of the curved surface faces the human eye, so that the plurality of first imaging faces form a curved surface, and the plurality of second imaging faces form a curved surface.

DETAILED DESCRIPTION

Figure 1:
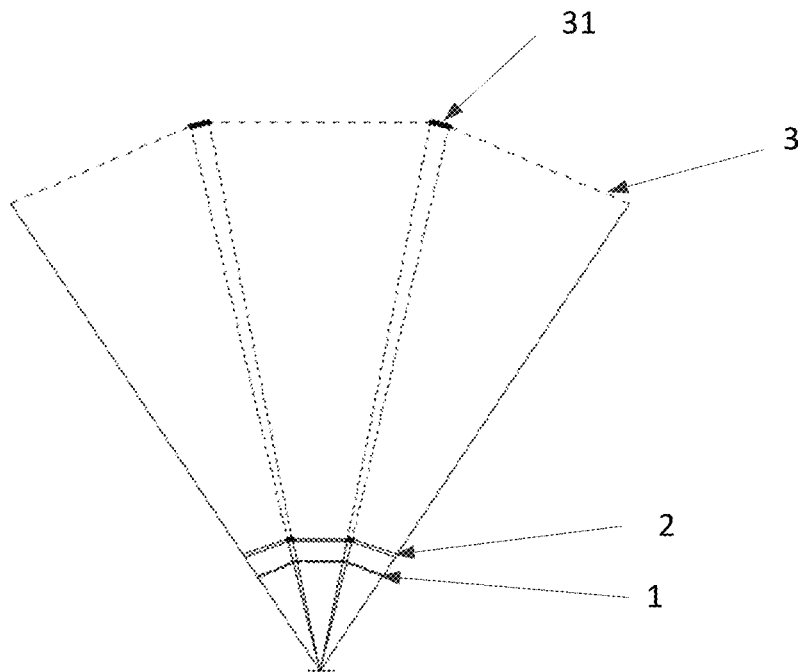
FIG. 1 is a schematic diagram of an imaging state of a spliced display screen in the related art.

To further clarify the objects, features and advantages of the embodiments of the present disclosure, a more particular description of the present disclosure will be rendered by reference to specific embodiments thereof which are illustrated in the appended drawings. Obviously, the embodiments described in the present disclosure are part of the all embodiments, in which some, but not all embodiments of the disclosure are shown. Based on the embodiments in the present disclosure, all other embodiments obtained by a person of ordinary skill in the art without inventive effort are within the scope of protection of this disclosure.

In the description of the present disclosure, it should be understood that the orientation or positional relationship indicated by the terms "center", "upper", "lower", "left", "right", "vertical", "horizontal", "inner", "outer", and the like is based on the orientation or positional relationship shown in the drawings, and is merely for convenience of describing the disclosure and simplifying the description, but not intended or implied that the referenced device or element must have a particular orientation, be constructed and operated in a particular orientation, and thus should not be construed as limiting the present disclosure. The terms "first", "second", and "third" are used for descriptive purposes only and are not to be construed as indicating or implying relative importance or implicitly indicating the number of technical features indicated.

In order to achieve a large field of view, a method of spliced display screens is generally used; as shown in FIG. 1, a micro-lens array 2 is arranged on the light-emitting side of a spliced display screen 1 to form an imaging face 3; however, due to the limitation of a frame of the display screen 1, a splice seam is formed at a splice part of two adjacent display screens after splicing; and a display black area 31 of a certain size is thus formed on the imaging face 3.

With regard to the above technical problem, with reference to FIGS. 2 to 5, the present embodiment provides a light field display system, including:

a plurality of light field display modules 20 spliced at an angle, wherein each of the light field display modules 20 includes a display screen 21 and a micro-lens array 22 located on a light-emitting side of the display screen 21;

a lens group 1', including a plurality of spliced lenses 1 corresponding to the plurality of light field display modules 20 on a one-to-one basis, wherein the lens group 1' is located at one side, away from the display screen 21, of the micro-lens array 22, and configured to form a plurality of first imaging faces 3 corresponding to a plurality of light field display modules 20 on a one-to-one basis on one side, away from the micro-lens array 22, of the display screen 21, the plurality of first imaging faces 3 are seamlessly spliced to form a plurality of second imaging faces 4 seamlessly spliced on a side, away from the plurality of light field display modules 20, of the plurality of first imaging faces 3, wherein the first imaging faces 3 display a corresponding upright virtual image of the light field display modules 20, with reference to FIGS. 2-5, the second imaging face 4 is located at a side, away from the light field display module 20, of the first imaging face 3, that is, the lens group 1', the light field display module 20, the first imaging face 3 and the second imaging face 4 are successively arranged along the direction away from the human eye; and each of the light field display modules 20 includes a micro-lens array 22 and a display screen 21 arranged in a direction away from a human eye.

A plurality of spliced light field display modules 20 are imaged by the spliced lens 1, and the upright virtual image formed is seamlessly spliced; the virtual image of the light field display modules 20 can be equivalent to a light field system, and is imaged again at a side away from the light field display modules 20; the obtained light field imaging face is a seamless light field imaging face with a large field of view and can be focused by a single eye, which can not only realize a large field of view and single eye stereoscopic visual display (light field display), but also solve the problem of splice seam during imaging.

In this embodiment, the first imaging face 3 is located at a distance of distinct vision of the human eye.

The distance of distinct vision is the most convenient and customary working distance for the eye under appropriate lighting conditions. The distance most suitable for a normal human eye to observe a small object in close proximity is about 25 cm. At this time, a regulating function of the human eye is not too tense, and the human eye can realize long-time observation without fatigue; the first imaging face 3 is located at the distance of distinct vision of the human eye, and can obtain a clear image, and the human eye is more comfortable in watching.

Figure 4:
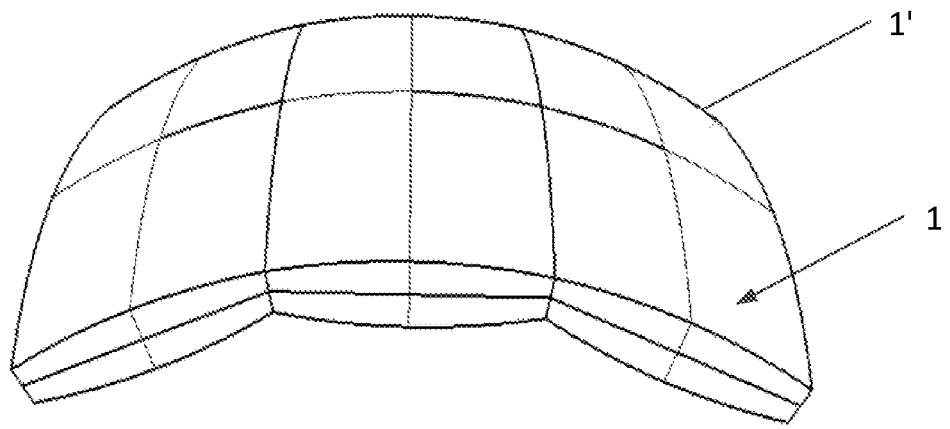
FIG. 4 is a schematic structural diagram of a spliced lens in an embodiment of the present disclosure.

In the present embodiment, the sliced lens 1 is a biconvex spherical lens or a plano-convex spherical lens based on the imaging principle of the convex lens. The number of the spliced lenses can be set according to practical requirements, and the greater the number of the spliced lenses 1, the greater the angle of field to be spliced. The spliced lens 1 shown in FIG. 4 is a biconvex spherical lens, and a spliced combination of three spliced lenses 1 is illustrated, but not limited thereto.

It is to be noted that a plurality of spliced lenses in a lens group can be provided separately, namely, the lens group is formed by splicing and fixedly connecting a plurality of individual spliced lenses together; and the plurality of spliced lenses in the lens group may also be integrally formed, i.e. the lens group is integral.

It should be noted that in the present embodiment, when the spliced lens is a plano-convex spherical lens, the plane side of the plano-convex spherical lens can be arranged facing the display screen, and can also be arranged facing the direction of a human eye, and since the object-side focal length and the image-side focal length of the plano-convex spherical lens are not changed, the object-image relationship is unchanged and the imaging is not affected.

In a specific implementation of the present embodiment, the spliced lens uses the plano-convex spherical lens, wherein the plane side of the plano-convex spherical lens is arranged facing the direction of the human eye, to facilitate the cleaning of stains, and when the human eye is closer to the screen, the angle of view is larger.

It should be noted that the focal length formula of the lens is:

$$\frac{1}{f} = (n-1)\left[\frac{1}{R_1} - \frac{1}{R_2} + \frac{(n-1)d}{nR_1R_2}\right],$$

where f is the focal length of the lens, n is the refractive index of the lens, $R_1$ and $R_2$ are spherical radii of two opposite sides of the lens, respectively, and d is the thickness of the lens. It can be seen therefrom that on the premise that the focal length f is determined, the spliced lens uses a biconvex spherical lens, and compared with the plano-convex spherical lens, the spherical radii of both sides of the biconvex spherical lens are smaller than the spherical radius of the convex surface of the plano-convex spherical lens, so that the curvature of the convex surface of the spliced lens can be reduced, and the spherical aberration is further reduced; and therefore, in a specific implementation of the present embodiment, the spliced lens 1 is preferably a biconvex spherical lens.

In the present embodiment, each of the first imaging faces 3 includes a first sub-imaging face 31 and a second sub-imaging face 32, the first sub-imaging face 31 displays an upright virtual image of the corresponding display screen 21, the second sub-imaging face 32 displays an upright virtual image of the corresponding micro-lens array 22, and the first sub-imaging face 31 is located on a focal plane of the virtual image of the micro-lens array 22 displayed by the second sub-imaging face 32, so that the light beam emitted by the virtual image of the display screen 21 displayed by the first imaging face 3 forms a collimated light beam incident on a human eye.

A plane passing through the focal point and perpendicular to the main optical axis of the lens is a focal plane, and light emitted from a point on the focal plane after passing through the lens becomes a bundle of parallel light forming a fixed included angle with the main optical axis; in the present embodiment, the first sub-imaging face 31 is located on the focal plane of the virtual image of the micro-lens array 22 displayed by the second sub-imaging face 32, namely, the virtual image of the display screen 21 displayed by the first sub-imaging face 31 is located on the focal plane of the virtual image of the micro-lens array 22 displayed by the second sub-imaging face 32, so the light beam emitted by the virtual image of the display screen 21 passes through the virtual image of the micro-lens array 22 to form collimated parallel light incident on the human eye.

In the present embodiment, a plurality of light field display modules 20 are spliced to form a curved surface, the inner concave surface of which faces the human eye. A plurality of light field display modules 20 are spliced to form a curved surface, the first imaging face 3 formed thereby is a curved surface, and the second imaging face 4 formed by a virtual light field system formed by the virtual image of the light field display module 20 displayed by the first imaging face 3 is a curved surface, to enlarge the field of view; and furthermore, with respect to the imaging face in the form of a plane, poor edge image is avoided.

It should be noted that the curved surface formed by splicing the plurality of light field display modules 20 is not a curved surface in a strict sense, as shown in FIG. 4.

In the present embodiment, the relationship between the actual distance $nf_2'$ between the first sub-imaging face 31 and the second sub-imaging face 32 and the distance t between the display screen 21 and the micro-lens array 22 satisfies the relationship:

$$\frac{nf_2'}{t} = \left(\frac{L_1 - l_3}{L_2}\right)^2. \quad (1)$$

Convex lens imaging longitudinal magnification formula: h'/H=v/u, where h' is the image height, H is the object height, v is the image distance, u is the object distance, and the lateral magnification $\beta = (h'/H)^2$. In the present embodiment, referring to FIG. 5, with respect to the image distance $v = L_1 - L_3$, and the object distance $u = L_2$ of the spliced lens, the above formula (1) is obtained.

Figure 5:
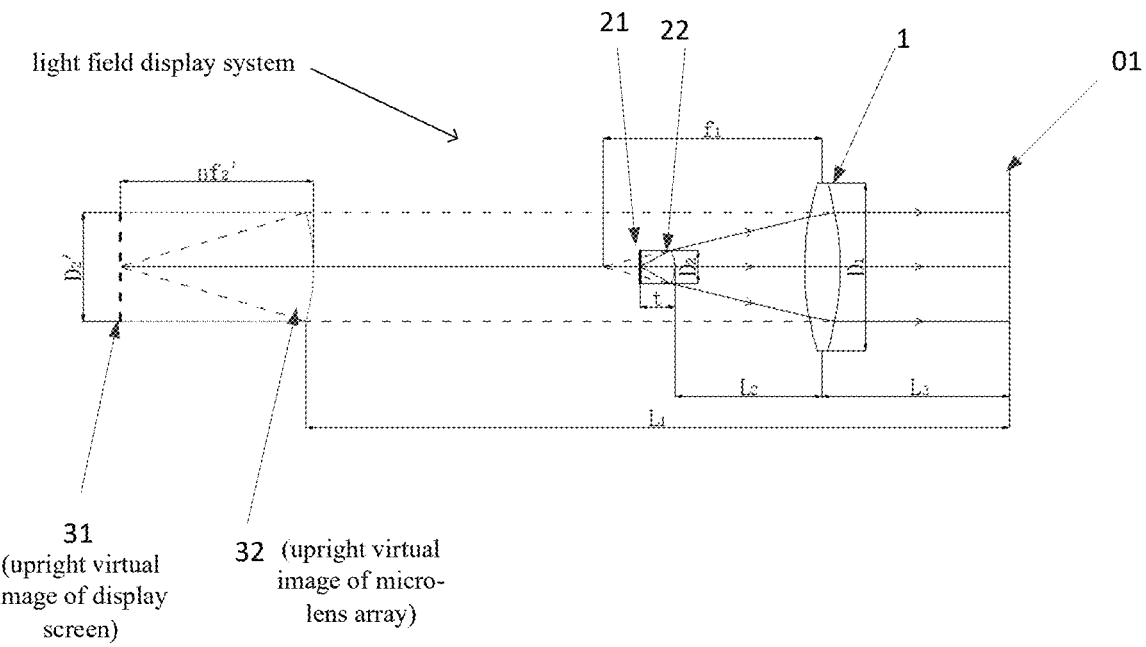
FIG. 5 is a schematic diagram of the principle of a light path according to an embodiment of the present disclosure.

The reference of the light field display is: the single eye receives collimated light of N pixels under each micro lens. Where N is also referred to as the number of viewpoints and required to be ≥2, optionally N≥20. Collimation means: the light beam emitted by the pixel in the display screen 21 is collimated and emitted after passing through the micro lens and the spliced lens 1, and the specific reference is shown in FIG. 5, and FIG. 5 shows that a part of the display screen 21 corresponding under one micro lens is imaged on the focal plane of the spliced lens 1 after passing through the micro lens, and therefore The light beam is collimated out through the spliced lens 1. In the present embodiment, the following formula is obtained according to the imaging principle of the convex lens:

$$\frac{1}{-(f_1 - L_2)} + \frac{1}{t/n} = \frac{1}{f_2}, \quad (2)$$

the above-mentioned light path collimation process can be equivalent to the second sub-imaging face 32 located at the viewing distance $L_1$ and the first sub-imaging face 31 located at the focal plane of the virtual image of the micro lens displayed by the second sub-imaging face 32 in FIG. 5; the first sub-imaging face 31 displays an upright virtual image of the display screen 21, and a pixel emergent light beam on the virtual image of the display screen 21 displayed on the first sub-imaging face 31 is directly collimated out and projected to the human eye 01 via the virtual image of the micro lens displayed on the second sub-imaging face 32. Preferably, the viewing distance $L_1$=250 mm (distance of distinct vision), and the process satisfies the following formula:

$$\frac{1}{-(L_1 - L_3)} + \frac{1}{L_2} = \frac{1}{f_1}, \quad (3)$$

where $f_1$ is the focal length of the spliced lens 1, $f_2$ is the focal length of the micro lens, $f_2'$ is the distance between the first sub-imaging face 31 and the second sub-imaging face 32 after the equivalent air layer, $L_1$ is the distance between the human eye 01 and the second sub-imaging face 32, $L_2$ is the distance between the spliced lens 1 and the micro lens, $L_3$ is the distance between the human eye 01 and the spliced lens 1, n is the refractive index of the micro lens, and t is the actual placement height of the micro lens with respect to the display screen 21;

it should be noted that for the micro lens, $f_1 - L_2$ is the image distance, and t/n is the object distance after the equivalent air layer; and for the spliced lens 1, $L_1 - L_3$ is the image distance, and $L_2$ is the object distance.

Figure 6:
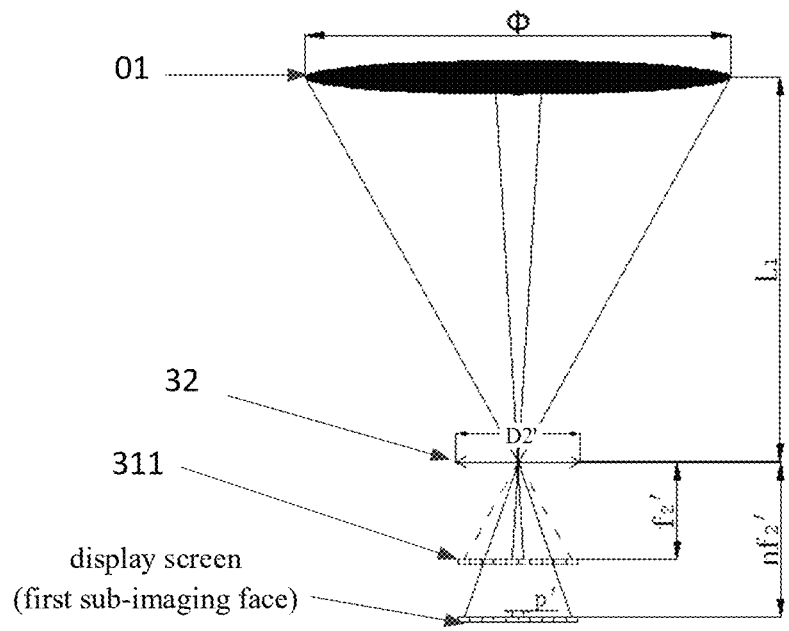
FIG. 6 is a schematic diagram 1 of a state in which a single eye receives light from a pixel on a display screen into a human eye in an embodiment of the present disclosure.

It should be noted that in order to facilitate calculation, the object distance and the image distance, etc. are calculated according to the values after the equivalent air layer, with reference to FIGS. 5 and 6, in FIG. 6, after the equivalent air, the distance from the display screen 311 to the second sub-imaging face is $f_2'$; the actual distance between the first sub-imaging face 31 and the second sub-imaging face 32 is $nf_2'$.

Referring to FIGS. 5 and 6, the following formulas are obtained from the geometric relationship:

$$\frac{\Phi/N}{p'} = \frac{L_1}{f_2'}; \quad (4)$$

$$\frac{p'}{p} = \frac{L_1 - L_3 + nf_2'}{t + L_2}, \quad (5)$$

where $\Phi$ is the diameter of the pupil of the human eye, N is the number of viewpoints, p is the pixel spacing on the display screen 21, and p' is the pixel spacing in the virtual image of the display screen 21 displayed by the first sub-imaging face 31;

it should be noted that $L_1 - L_3 + nf_2'$ is the actual distance between the spliced lens 1 and the first sub-imaging face 31, i. e. the image distance, and $t + L_2$ is the actual distance between the spliced lens 1 and the display screen 21, i.e. the object distance, and if the values are values after the equivalent air layer, formula (5) is translated to $$\frac{p'}{p} = \frac{L_1 - L_3 + f_2'}{\frac{t}{n} + L_2}.$$

The distance $f_2'$ between the first sub-imaging face 31 and the second sub-imaging face 32 after the equivalent air layer is obtained from formulas (1) to (5):

$$f_2' = \frac{-b + \sqrt{b^2 - 4ac}}{2a}, \quad (6)$$

where, $$a = \frac{\Phi n L_2^2}{(L_1 - L_3)^2},$$

$b = \Phi L_2 - npNL_1$, $c = -(L_1 - L_3) pNL_1$;

and the actual placement height t of the micro lens with respect to the display screen 21 is obtained from formulas (1) to (5):

$$t = \frac{nL_2^2 f_2'}{(L_1 - L_3)^2}; \quad (7)$$

the focal length $f_1$ of the spliced lens 1 is obtained from formulas (1) to (5):

$$f_1 = \frac{L_2(L_1 - L_3)}{L_1 - L_3 - L_2}; \quad (8)$$

the focal length $f_2$ of the micro lens is obtained from formulas (1) to (5):

$$f_2 = \frac{t(f_1 - L_2)}{n(f_1 - L_2) - t}. \quad (9)$$

In the present embodiment, the aperture $D_2$ of the micro lens satisfies the following formula:

$$D_2 \geq \frac{2L_1 L_2}{L_1 - L_3} \tan\left(\frac{\varepsilon N}{2}\right),$$

where $\varepsilon$ is a limiting angle of resolution of the human eye.

The aperture of the micro lens needs to satisfy the single eye viewpoint number N which can be recognized by the human eye, and specifically also needs to satisfy the following relationship:

$$\frac{2\arctan\left(\frac{D_2'/2}{L_1}\right)}{\varepsilon} \geq N \quad (10)$$

Figure 7:
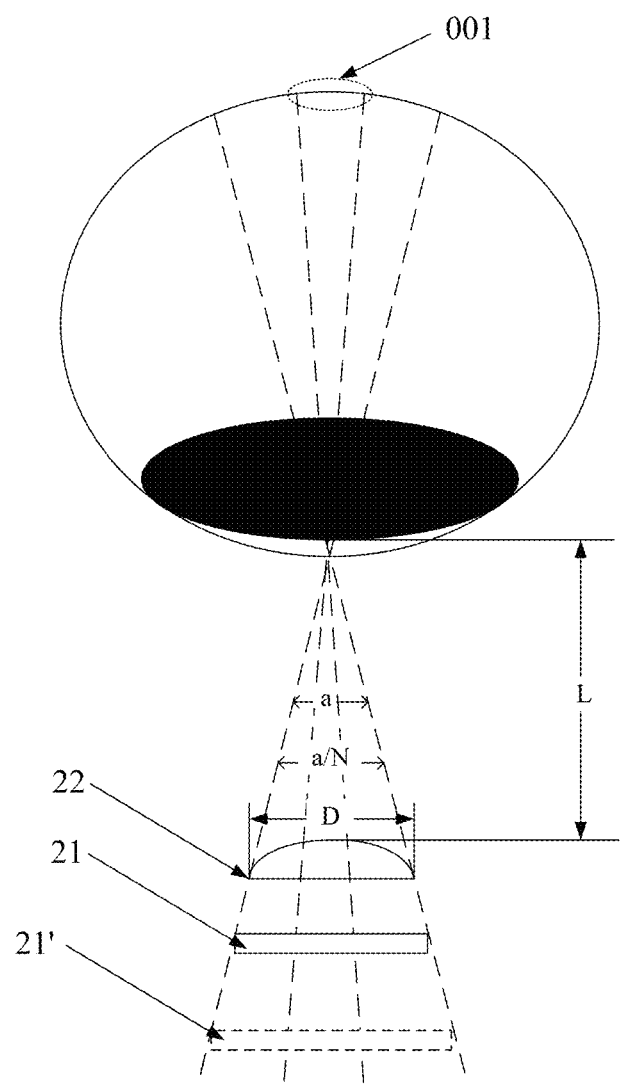
FIG. 7 is a schematic diagram 2 of a state in which a single eye receives light from a pixel on a display screen into a human eye according to an embodiment of the present disclosure.

Referring to FIG. 7, $$\frac{\alpha}{N} > \varepsilon,$$

it is ensured that only one viewpoint is received and recognized on one cone cell 001, and $$\alpha = 2\arctan\frac{D}{2L},$$

D in FIG. 7 corresponds to $D_2'$ in the present embodiment, and L in FIG. 7 corresponds to $L_1$ in the present embodiment; the image 21' of the display screen 21 after being magnified by the micro lens is seen by a human eye, and thus the above-mentioned formula (10) is obtained, where $\varepsilon$ is the limiting angle of resolution of a human eye, N is the number of viewpoints of the incident single eye, D is the length of the micro lens in the direction perpendicular to the main optical axis thereof, L is the distance from the micro lens to the human eye, and a is the total included angle of the N pixels seen by the human eye through a single micro lens relative to the human eye.

In formula (10), $D_2'$ is the aperture of the equivalent micro lens, and its relationship with the micro lens aperture $D_2$ is:

$$\frac{D_2}{D_2'} = \frac{L_2}{L_1 - L_3} \quad (11)$$

where $L_2$ is the distance between the spliced lens 1 and the micro lenses, and $L_1$-$L_3$ is the distance between the spliced lens 1 and the second sub-imaging face 32.

From the above-mentioned formula (10) and formula (11), it is obtained that the aperture $D_2$ of the micro lens satisfies the formula:

$$D_2 \geq \frac{2L_1 L_2}{L_1 - L_3} \tan\left(\frac{\varepsilon N}{2}\right).$$

Since the resolution of light field imaging decreases as the aperture of the micro lens increases, in order to obtain a better light field imaging effect, in a specific implementation of the present embodiment, the aperture $D_2$ of the micro lens is:

$$D_2 = \frac{2L_1 L_2}{L_1 - L_3} \tan\left(\frac{\varepsilon N}{2}\right).$$

Figure 2:
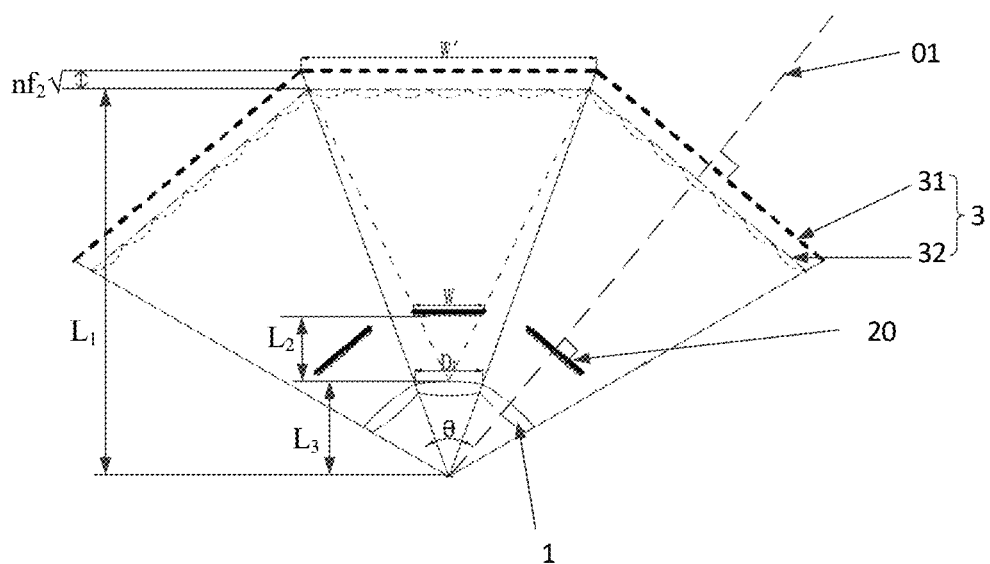
FIG. 2 is a schematic diagram of a imaging state of a light field display module in an embodiment of the present disclosure.
Figure 3:
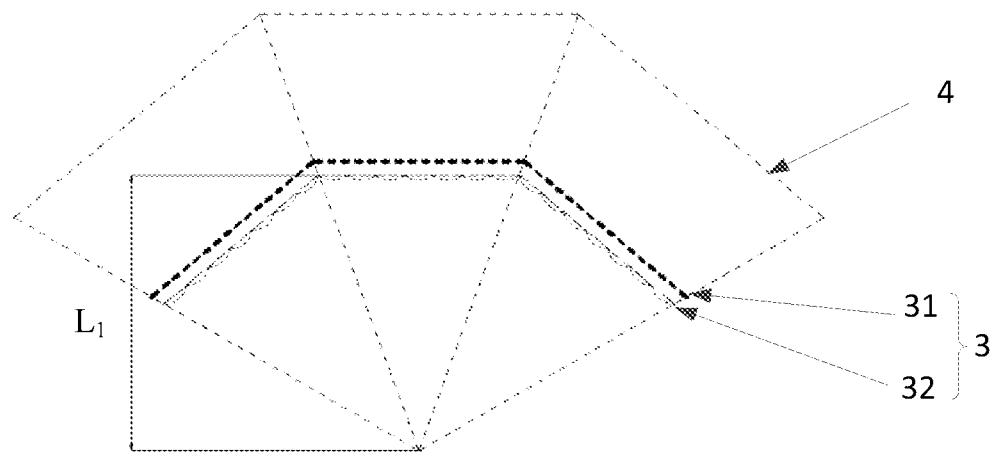
FIG. 3 is a schematic diagram of a positional relationship between a first imaging face and a second imaging face in an embodiment of the present disclosure.

In this embodiment, with reference to FIGS. 2 and 5, the aperture $D_1$ of the spliced lens 1 satisfies the following formula:

$$D_1 = 2L_3 \tan\left(\frac{\theta}{2}\right),$$

where $\theta$ is a field angle corresponding to the single spliced lens 1.

With reference to FIGS. 2 and 5, it can be seen from the geometrical relationship that the width W of the display screen 21 and the width W' of the virtual image of the display screen displayed by the first sub-imaging face 31 need to satisfy the following relationship: $nf_2'$ $$W' = 2(L_1 + nf_2')\tan\frac{\theta}{2} \quad (12)$$

-continued $$\frac{w}{w'} = \frac{L_2 + t}{L_1 + nf_2' - L_3} \quad (13)$$

It is obtained from the above formulas (12) and (13), the width w of each display screen 21 satisfies the following formula:

$$w = \frac{2(L_2 + t)(L_1 + nf_2')\tan\frac{\theta}{2}}{L_1 + nf_2' - L_3}.$$

With reference to FIG. 2, in order to ensure that the light of the second imaging face entering the human eye is collimated, the distance from the display screen to the human eye, and the distance from the display screen to the spliced lens and the micro lens are all determined, two oblique sides of a triangle is formed by connecting lines from the center of the spliced lens 1 to two ends of the virtual image of the display screen displayed in the first sub-imaging face in the direction perpendicular to the main optical axis of the spliced lens respectively; at this moment, two ends of the display screen 21 in the direction perpendicular to the main optical axis of the spliced lens are respectively located on two oblique sides of the triangle, and at this moment, the length W of the display screen is an optimal setting, and the display screen is located in the triangle; namely, the length of the display screen in the direction perpendicular to the main optical axis of the spliced screen is less than W, then a seamless splice cannot be formed between two adjacent first sub-imaging faces, and the length of the display screen in the direction perpendicular to the main optical axis of the spliced screen is greater than W; and then the part, outside the triangle, of the display screen cannot be displayed on the first sub-image plane, and costs are wasted.

It should be noted that in the present embodiment, the structures of the plurality of spliced lenses in the lens group are the same, and the structures of the plurality of light field display modules are the same.

It should be noted that the included angle between two adjacent spliced lenses is limited by the imaging distance (the position of the first imaging face), the field angle θ of a single spliced lens, etc. and can be set according to practical requirements.

It should be noted that in order to ensure a better visual effect, when the length W of the display screen is an optimal setting, for a single spliced lens, a line from the human eye to the edge of the corresponding first imaging face forms an isosceles triangle. With reference to FIG. 2, in the present embodiment, three spliced lenses are used. Three isosceles triangles are formed. A line 01 between the midpoint of the imaging portion on the first imaging face 3 corresponding to the single spliced lens and the human eye is perpendicular to the imaging portion on the first imaging face (the line 01 passes through the midpoint of the corresponding display screen and is perpendicular to the corresponding display screen). In addition, it can be seen from FIG. 2 that in a specific embodiment in the present embodiment, the angle between two adjacent spliced lenses is complementary to (but not limited to) the field angle θ of a single spliced lens, in order to ensure a large field of view effect, the field angle θ of each spliced lens is the same, which is the maximum field angle of 20 degrees (but not limited thereto), i.e. the angle between two adjacent spliced lenses is 160 degrees.

In one specific implementation of the present embodiment, it is known that: $L_1$=250 mm, $L_2$=30 mm, $L_3$=40 mm, pixel pitch p=0.00847 mm (physical space 3000 PPI), pupil diameter Φ=3 mm, human eye limit resolution angle ε=1', number of viewpoints N=20, single screen view angle θ=20°, and n=1.5, the following is obtained by the above formulas:

| Index | Results |
|---|---|
| Placement height t of micro lenses with respect to display screen | 6.086 mm |
| Focal length $f_2$ of micro lens | 21.523 mm |
| Aperture $D_2$ of micro lens | 0.208 mm |
| Focal length $f_1$ of spliced lens | 35 mm |
| Aperture $D_1$ of spliced lens | 14.106 mm |
| Single-screen width W of spliced display screen | 13.727 mm |

While the foregoing is directed to some embodiments of the present disclosure, it will be understood by those skilled in the art that various improvements and modifications may be made without departing from the principle of the present disclosure, and theses improvement and modifications shall fall within the scope of protection of the present disclosure.

What is claimed is:

1. A light field display system comprising:
a plurality of light field display modules spliced at an angle, wherein each of the light field display modules comprises a display screen and a micro-lens array located on a light-emitting side of the display screen; and
a lens group, comprising a plurality of spliced lenses corresponding to the plurality of light field display modules on a one-to-one basis, wherein the lens group is located on a side, away from the display screen, of the micro-lens array, and forms a plurality of first imaging faces, wherein the first imaging faces are on the side, away from the micro-lens array, of the display screen, and correspond to the plurality of light field display modules on one-to-one basis, the plurality of first imaging faces are seamlessly spliced and forms a plurality of second imaging faces, wherein the second imaging faces are on a side, away from the light field display module, of the plurality of first imaging faces and seamlessly spliced, and the first imaging face is configured to display an upright virtual image of the corresponding light field display module;
wherein the spliced lens is a biconvex spherical lens;
wherein each of the first imaging faces comprises a first sub-imaging face and a second sub-imaging face which are not of the same image face, the first sub-imaging face is configured to display an upright virtual image of the display screen, the second sub-imaging face is configured to display an upright virtual image of the corresponding micro-lens array, and the first sub-imaging face is located on a focal plane of the virtual image of the micro-lens array displayed by the second sub-imaging face, so that a light beam emitted from the virtual image of the display screen displayed by the first imaging face forms a collimated light beam incident on a human eye;
the display screen is a part of the second sub-imaging face.

2. The light field display system of claim 1, wherein the first imaging face is located at a distance of distinct vision of a human eye.

3. The light field display system of claim 1, wherein the plurality of light field display modules are spliced to form a curved surface having an inner concave surface facing a human eye.

4. The light field display system of claim 1, wherein a relationship between an actual distance $nf_2'$ between the first sub-imaging face and the second sub-imaging face and a distance t between the display screen and the micro-lens array satisfies the relationship:

$$\frac{nf_2'}{t} = \left(\frac{L_1 - L_3}{L_2}\right)^2, \qquad (1)$$

where $f_2'$ is the distance between the first sub-imaging face and the second sub-imaging face after an equivalent air layer, $L_1$ is a distance between the human eye and the second sub-imaging face, $L_2$ is a distance between the spliced lens and a micro lens in the micro-lens array, $L_3$ is a distance between the human eye and the spliced lens, n is a refractive index of the micro lens in the micro-lens array, and t is an actual placement height of the micro lens in the micro-lens array relative to the display screen.

5. The light field display system of claim 4, wherein the actual placement height t of the micro lenses with respect to the display screen satisfies the following conditions:

$$\frac{1}{-(f_1 - L_2)} + \frac{1}{t/n} = \frac{1}{f_2}; \qquad (3)$$

$$\frac{1}{-(L_1 - L_3)} + \frac{1}{L_2} = \frac{1}{f_1},$$

where $f_1$ is a focal length of the spliced lens, $f_2$ is the focal length of the micro lens, $f_2'$ is the distance from the first sub-imaging face to the second sub-imaging face after the equivalent air layer, $L_1$ is the distance from the human eye to the second sub-imaging face, $L_2$ is the distance between the spliced lens and the micro lens, $L_3$ is the distance from the human eye to the spliced lens, n is the refractive index of the micro lens, and t is the actual placement height of the micro lens relative to the display screen;

and wherein the following geometrical relations are satisfied:

$$\frac{\Phi/N}{p'} = \frac{L_1}{f_2'}; \qquad (4)$$

$$\frac{p'}{p} = \frac{L_1 - L_3 + nf_2'}{t + L_2}, \qquad (5)$$

where $\Phi$ is a pupil diameter of a human eye, N is the number of viewpoints, p is the pixel spacing on the display screen, and p' is the pixel spacing in the virtual image of the display screen displayed by the first sub-imaging face;

and wherein the following conditions are satisfied:

$$f_2' = \frac{-b + \sqrt{b^2 - 4ac}}{2a}; \qquad (6)$$

where, $$a = \frac{\Phi n L_2^2}{(L_1 - L_3)^2}, b = \Phi L_2 - npNL_1, c = -(L_1 - L_3)pNL_1;$$

and the following conditions are satisfied;

$$f_1 = \frac{L_2(L_1 - L_3)}{L_1 - L_3 - L_2}; \qquad (8)$$

$$f_2 = \frac{t(f_1 - L_2)}{n(f_1 - L_2) - t}. \qquad (9)$$

6. The light field display system of claim 5, wherein an aperture $D_2$ of the micro lenses satisfies the following formula:

$$D_2 \geq \frac{2L_1 L_2}{L_1 - L_3} \tan\left(\frac{\varepsilon N}{2}\right),$$

where $\varepsilon$ is a limiting angle of resolution of the human eye.

7. The light field display system of claim 5, wherein an aperture $D_1$ of the spliced lens satisfies the following formula:

$$D_1 = 2L_3 \tan\left(\frac{\theta}{2}\right),$$

where $\theta$ is a field angle corresponding to a single the spliced lens.

8. The light field display system of claim 5, wherein a width w of the display screen satisfies the following formula:

$$w = \frac{2(L_2 + t)(L_1 + nf_2')\tan\frac{\theta}{2}}{L_1 + nf_2' - L_3}.$$

9. The light field display system of claim 1, wherein the plurality of light field display modules are spliced to form a first curved surface, an inner concave surface of the first curved surface faces a human eye to enable the plurality of first imaging faces to form a second curved surface and the plurality of second imaging faces to form a third curved surface.

* * * * *